(12) United States Patent  
Vihtari et al.

(10) Patent No.: US 8,848,524 B2
(45) Date of Patent: Sep. 30, 2014

(54) MULTIPLE MAJOR VERSION SIGNALING ON SESSION INITIATION

(75) Inventors: Mike Vihtari, Kanata (CA); Kugendran Sabaratnam, Kanata (CA)

(73) Assignee: Alcatel Lucent, Boulogne-Billancourt (FR)

( * ) Notice: Subject to any disclaimer, the term of this patent is extended or adjusted under 35 U.S.C. 154(b) by 209 days.

(21) Appl. No.: 13/434,046

(22) Filed: Mar. 29, 2012

(65) Prior Publication Data

US 2013/0260731 A1    Oct. 3, 2013

(51) Int. Cl.
*H04J 1/16*    (2006.01)

(52) U.S. Cl.
USPC .......................................... 370/230; 455/418

(58) Field of Classification Search
USPC .................................. 370/329, 230; 455/418
See application file for complete search history.

(56) References Cited

U.S. PATENT DOCUMENTS

| 2007/0153995 | A1* | 7/2007 | Fang et al. ............... 379/114.03 |
| 2008/0229385 | A1* | 9/2008 | Feder et al. ....................... 726/1 |
| 2012/0314632 | A1* | 12/2012 | Martinez De La Cruz et al. ............................. 370/310 |

OTHER PUBLICATIONS

3GPP TS 29.212, 3rd Generation Partnership Project; Technical Specification Group Core Network and Terminals; Policy and Charging Control (PCC) Over Gx Reference Point (Release 10), V10.5.0 (2011), pp. 1-132.
3GPP TS 29.214, 3rd Generation Partnership Project; Technical Specification Group Core Network and Terminals; Policy and Charging Control Over Rx Reference Point (Release 10), V10.5.0 (2011), pp. 1-50.
3GPP TS 29.215, 3rd Generation Partnership Project; Technical Specification Group Core Network and Terminals; Policy and Charging Control (PCC) Over S9 Reference Point; Stage 3 (Release 10), V10.4.0 (2011), pp. 1-42/.

* cited by examiner

*Primary Examiner* — Sai-Ming Chan
(74) *Attorney, Agent, or Firm* — Kramer Amado P.C.

(57) ABSTRACT

Embodiments of the invention provide an improved major release negotiation mechanism between an initiating node and a receiving node during Diameter session establishment in a 3GPP network.

20 Claims, 3 Drawing Sheets

MULTIPLE MAJOR VERSION SIGNALING ON SESSION INITIATION

FIELD OF THE DISCLOSURE

The disclosures made herein relate generally to the telecommunications industry. The invention discussed herein is in the general classification of a device capable of operation in a mode compatible with different versions of the 3GPP standards and a method for operating according to different versions of the 3GPP standards at the PCRF node.

BACKGROUND

This section introduces aspects that may be helpful in facilitating a better understanding of the invention. Accordingly, the statements of this section are to be read in this light and are not to be understood as admissions about what is in the prior art or what is not in the prior art. Several technical terms and/or phrases will be used throughout this application and merit a brief explanation. The 3rd Generation Partnership Project (3GPP) attempts to create a uniform third-generation mobile phone system. 3GPP standards are called releases and different functionality is present in the different versions of the releases. The 3GPP standards continue to evolve and the major releases of the standards can be differentiated using supported features. It is required that a single release of the Policy and Charging Rules Function (PCRF) be used with different networks operating with different minor versions of the standards.

When a new session is established between two 3GPP nodes, e.g.: a PCRF node and a Gxx gateway, the initiating node indicates, in a session request, which 3GPP major release version should be used for the session. The receiving node is either capable of establishing the session under that major release version and replies as such, or if it is not capable, it replies with the next highest major release that under which it can establish the requested session. For example, a Gxx gateway might request a session under 3GPP major release 10 and a PCRF node might reply that it can establish the session under major release 8 or 9. The Gxx gateway would then send a message to the PCRF node indicating that the session should be established under major release 9. Some additional aspects of the prior art are discussed with reference to FIG. 2 below.

Although this exchange between the nodes only takes a few messages, it is highly desirable to have an improved system for negotiating releases during session establishment. for nodes handling a large volume of such messages, and when session establishment delay is undesirable, for example in the case of S9 roaming, it would be advantageous to have a faster and more efficient method of signaling negotiation of the major release on a session request.

SUMMARY OF THE DISCLOSURE

In embodiments of the invention the initiating node can specify one or more secondary major releases in addition to the preferred major release in a session request message. The receiving node can then determine which release to use and communicate that to the initiating node in a session request answer message.

Some embodiments of the invention provide a method of negotiating a release version, performed by a network node. The method comprises steps of: receiving from an initiating node, a session request comprising identification of a plurality of releases supported by the initiating node; determining which of the plurality of releases are also supported by the network node; selecting a preferred release from the also supported releases; transmitting to the initiating node, identification of said selected release.

In some embodiments the preferred release comprises the most recent release.

In some embodiments the session request comprises a Diameter protocol message.

In some embodiments the identification of supported releases is contained in a Supported-Features Attribute Value Pair (AVP).

In some embodiments the network node comprises a Policy and Charging Rule Function (PCRF) node.

In some embodiments the initiating node comprises a Policy and Charging Enforcement Function (PCEF) gateway node and the message is received on a Gx interface.

In some embodiments the initiating node comprises a Bearer Binding and Event Reporting Function (BBREF) gateway node and the message is received on a Gxx interface.

In some embodiments the initiating node comprises an Application Function (AF) node and the message is received on an Rx interface.

In some embodiments the initiating node comprises a PCRF node and the message is received on an S9 interface.

Another aspect of embodiments of the invention provides a method of negotiating a release version, performed by an initiating network node. The method comprises steps of: sending a session request comprising identification of a plurality of releases supported by said initiating node, to a receiving node; receiving from said receiving node, identification of a release selected by said receiving node, also supported by said receiving node from said plurality of releases.

Another aspect of embodiments of the invention provides a tangible and non-transitory machine-readable storage medium encoded with instructions for execution by a network node, the tangible and non-transitory machine-readable storage medium comprising: instructions for receiving at the network node, from an initiating node, a session request comprising identification of a plurality of releases supported by the initiating node; instructions for determining which of the plurality of releases are also supported by the network node; instructions for selecting a preferred release from the also supported releases; instructions for transmitting to the initiating node, the selected release.

In some embodiments the tangible and non-transitory machine-readable storage medium comprises a Diameter Protocol stack.

BRIEF DESCRIPTION OF THE DRAWINGS

Some embodiments of apparatus and/or methods in accordance with embodiments of the present invention are now described, by way of example only, and with reference to the accompanying drawings in which.

In the figures, like features are denoted by like reference characters.

DETAILED DESCRIPTION

Figure 1:
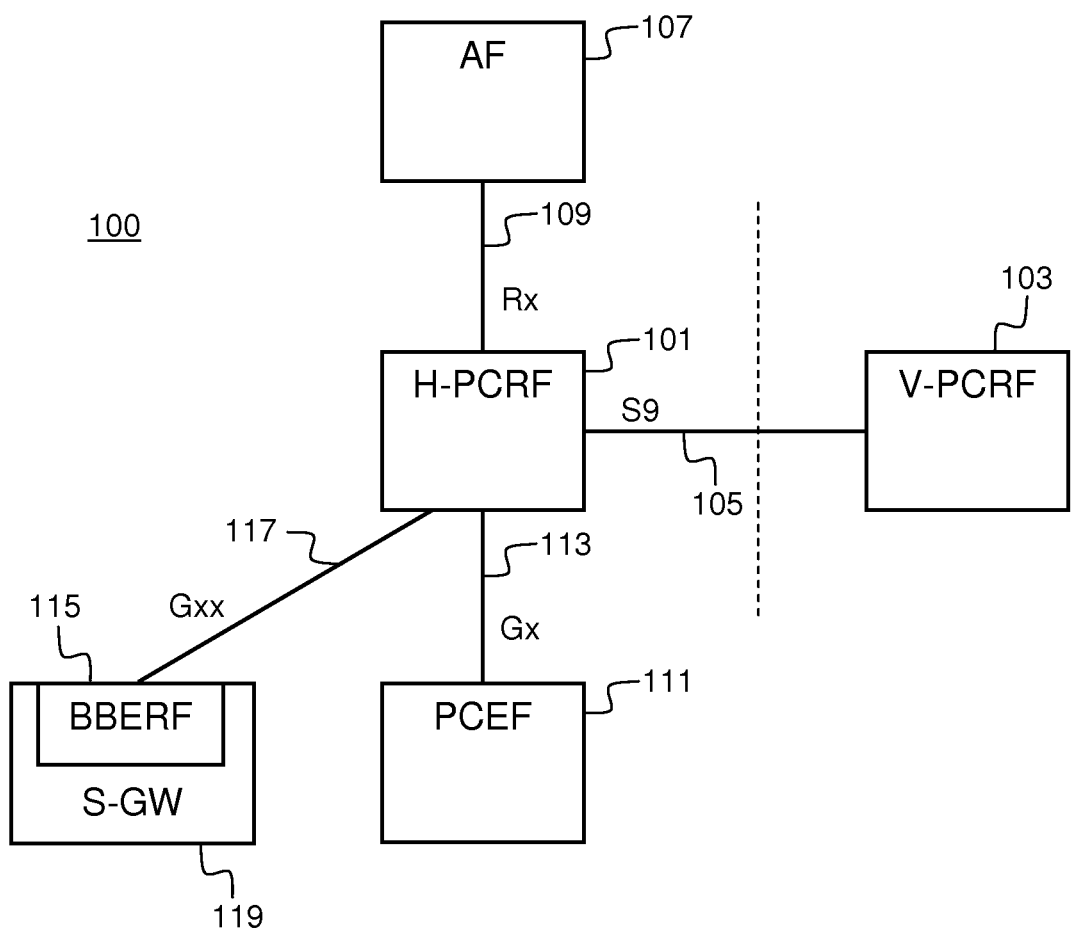
FIG. 1 illustrates a simplified block diagram of nodes of a 3GPP network.

FIG. 1 illustrates various elements of a 3rd Generation Partnership Project (3GPP) network 100. Policy and Charging Rule Function (PCRF) nodes 101, 103 can be a Home-PCRF 101 or a Visiting-PCRF 103 and communicate between themselves via the 3GPP-standard-defined S9 interface 105. PCRF 101 communicates with Application Function (AF) node 107 via the 3GPP-standard-defined Rx interface 109. PCRF 101 communicates with a Policy and Charging Enforcement Function (PCEF) node 111 via 3GPP-standard-defined Gx interface 113. PCRF 101 communicates with a Bearer Binding and Event Reporting Function (BBERF) node 115 via 3GPP-standard-defined Gxx interface 117. The BBERF 115 functionality can be implemented as a part of a Serving Gateway (S-GW) 119. The S9, Rx, Gx and Gxx interfaces are defined by 3GPP Technical Specifications (TS) 29.215, 29.214, 29.212, and 29.212 standards respectively.

Diameter protocol communications sessions are established by sending a session request message to the PCRF 101. For example, a PCEF would use a Gx Credit Control Request (CCR) message; a BBERF would use a Gxx CCR message; an AF node would use an Rx AA-Request (AAR) message. A PCRF peer would use an S9 CCR message. These session request messages include a Supported-Features Attribute Value Pair (AVP) to inform the receiving node about the required and optional features that the initiating node supports.

Figure 2:
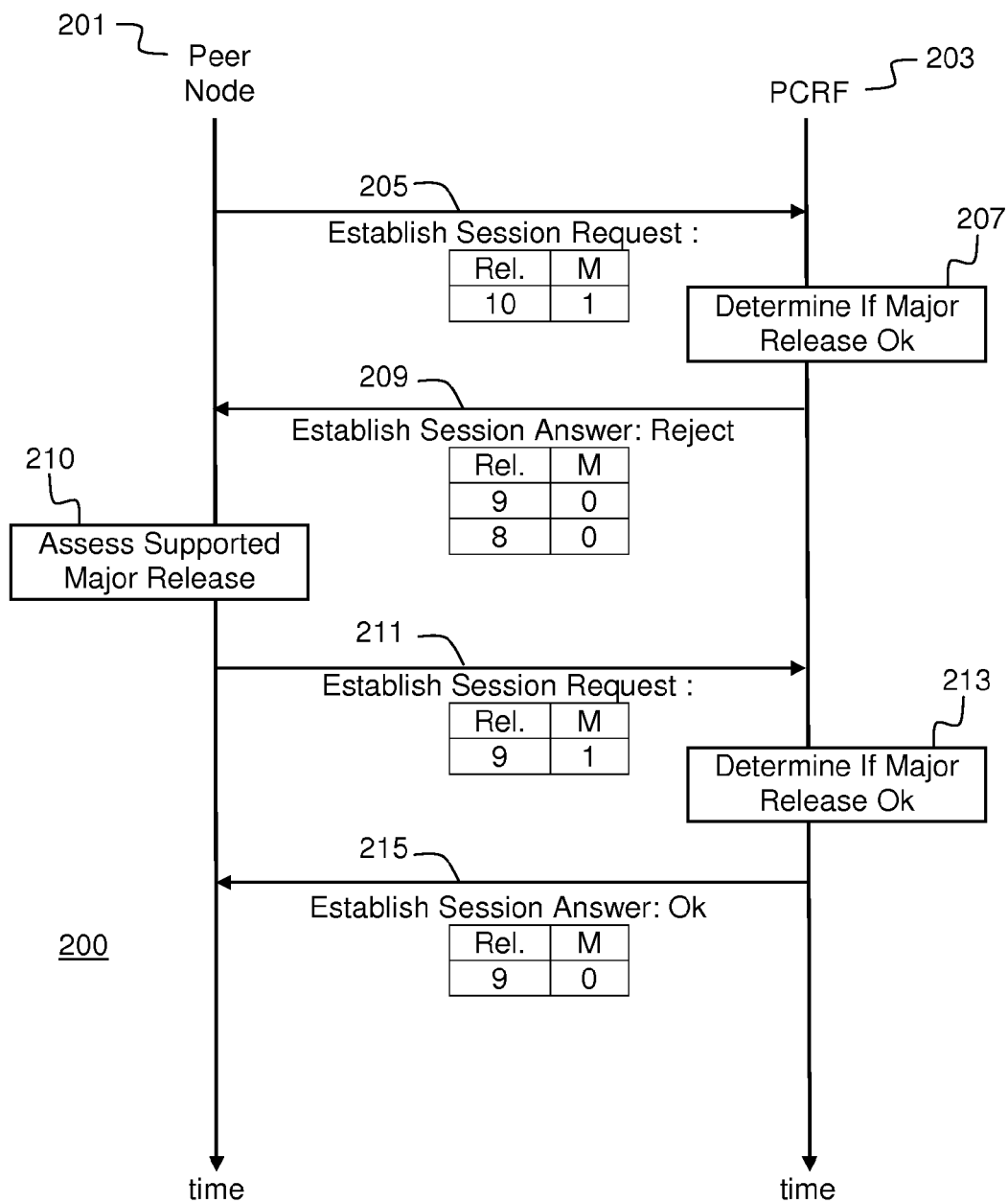
FIG. 2 illustrates a message flow diagram as contemplated by the 3GPP standard.

FIG. 2 illustrates messaging between PCRF node 203 and an initiating Peer Node 201 in a session establishment scenario as contemplated by the 3GPP standards. Peer node 201 can represent a Diameter peer node such as an AF node 107, a PCEF node 111, a BBERF node 115 or a peer PCRF 103. The origination and termination of messages at the initiating peer node 201 and PCRF node 203, and the respective operations, are depicted along two vertical lines labeled Peer Node and PCRF respectively with time advancing from top to bottom of the figure. Initiating peer node 201 sends a session establishment request message 205 to the PCRF 203 to establish a Diameter session. The message is in accordance with Diameter protocol messaging and as defined by the 3GPP standards for the appropriate interface (Rx, Gx, Gxx, S9). The request message 205 includes a Supported-Features AVP having a Vendor-ID, a Feature-List-ID and a Feature-List. The Feature-List, as defined by the 3GPP standards, includes an indication of a major release of the 3GPP standard under which the session is to be established, the indication taking the form of a binary word having certain bits set in a predefined manner to indicate the major release. In the scenario of FIG. 2, Peer Node 201 is running 3GPP major release 10 and PCRF node 203 is running 3GPP major release 9. The Supported-Feature AVP of request message 205 specifies release 10, with the corresponding "M" bit (Mandatory bit) set to "1" to indicate that support of release 10 is required to be able to establish a session based on the request message 205. Upon receiving the request 205, at step 207 the PCRF 203 determines if the release 10 indicated in the request message 205 is supported by the PCRF 203. Since PCRF 203 is running release 9 in this example, PCRF 203 sends a session establishment answer message 209 to Peer Node 201 rejecting the session establishment request message 205 and with the Supported-Features AVP having the feature bits for release 8 and release 9 set and with the corresponding "M" bits cleared, indicating that only release 8 and release 9 are supported by PCRF 203. At step 210 Peer Node 201 then assesses which major releases are supported by PCRF Node 203. Since Peer Node 201 supports 3GPP Releases 8, 9 and 10, and PCRF node 203 supports releases 8 and 9, Peer Node 201 selects release 9 as the optimal release for the Diameter session with PCRF Node 203, and sends a session establishment request message 211 to the PCRF 203 identifying release 9 as mandatory. At step 213 the PCRF 203 determines that release 9 indicated in the request message 211 is supported by the PCRF 203, and responds with session establishment answer message 215, accepting release 9 as version of 3GPP standard to use for the session.

Figure 3:
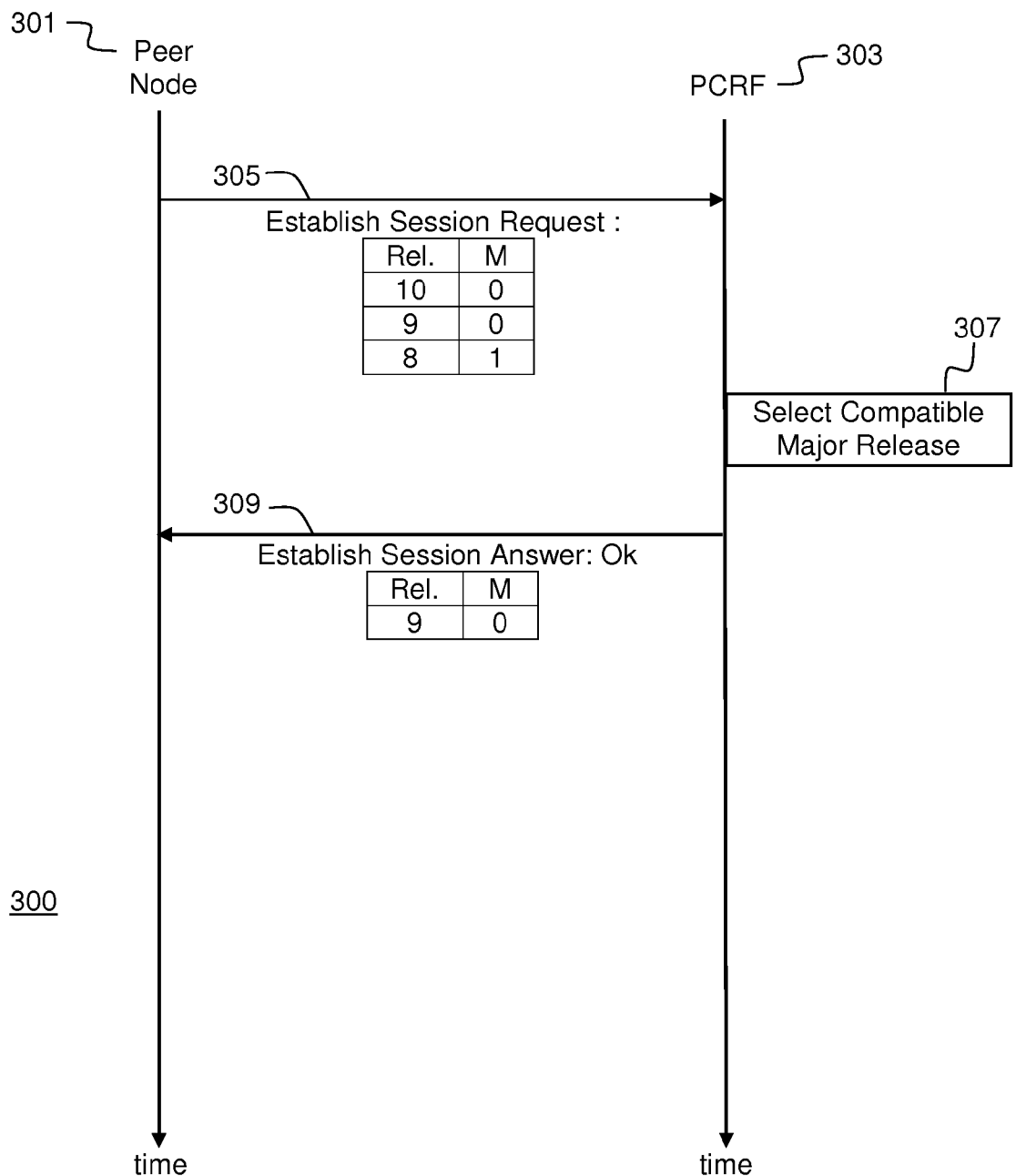
FIG. 3 illustrates a message flow diagram according to an embodiment of the invention.

FIG. 3 illustrates messaging between PCRF node 303 and an initiating Peer Node 301 in a session establishment scenario in accordance with embodiments of the present invention. Initiating peer node 301 sends a session establishment request message 305 to the PCRF 303 to establish a Diameter session. The request message 305 includes a Supported-Features AVP having a Vendor-ID, a Feature-List-ID and a Feature-List. The Feature-List, includes an indication of one or more major releases of the 3GPP standard supported by Peer Node 301 under which the session is to be established. In this example the feature bits representing release 8, 9 and 10 are set and the "M" bit corresponding to the lowest release required—release 8 is set, to indicate that Peer Node 301 supports release 8, 9, and 10 and that release 8 is required as a minimum.

Upon receiving session establishment request message 305, at step 307 the PCRF 303 analyzes message 305 to compare the releases supported by Peer Node 301 with the releases supported by PCRF 303 and selects the highest matching release. In this example, PCRF 303 supports release 8 and 9, thus PCRF 303 selects release 9. PCRF 303 then responds with session establishment answer message 309, with the Supported-Features AVP having the feature bit for release 9 set and with the corresponding "M" bit cleared, indicating that release 9 has been selected by PCRF 203 and accepting the session establishment request.

In this manner, only one round-trip request/response is required to negotiate major releases between a PCRF and an initiating peer node during session establishment. This can have the advantage of saving one or more round-trip request/responses during session establishment for interacting nodes supporting different combinations of releases. Thus for nodes handling a large volume of such messages and for situations where session establishment delay is undesirable, for example in the case of S9 roaming, the described embodiments can be especially valuable, by improving efficiency and performance.

Note that the standard session establishment procedure of FIG. 2 is still supported so that PCRF nodes supporting this embodiment can inter-operate seamlessly with Peer Nodes that do not support this embodiment.

The embodiments described above can be implemented as a Diameter Protocol Stack which can be incorporated into a 3GPP network node.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

It should be appreciated by those skilled in the art that any block diagrams herein represent conceptual views of illustrative circuitry embodying the principles of the invention.

Numerous modifications, variations and adaptations may be made to the embodiment of the invention described above without departing from the scope of the invention, which is defined in the claims.

What is claimed is:

1. A method of negotiating a release version, performed by a network node, the method comprising steps of:
receiving from an initiating node, a session request comprising identification of a plurality of releases supported by said initiating node;
determining which of said plurality of releases are also supported by said network node;
selecting a preferred release from said also supported releases; and
transmitting to said initiating node, identification of said selected release.

2. The method of claim 1, wherein said preferred release comprises the most recent release.

3. The method of claim 1, wherein said session request comprises a Diameter protocol message.

4. The method of claim 3, wherein said identification of supported releases is contained in a Supported-Features Attribute Value Pair (AVP).

5. The method of claim 3 wherein said network node comprises a Policy and Charging Rule Function (PCRF) node.

6. The method of claim 5 wherein said initiating node comprises a Policy and Charging Enforcement Function (PCEF) gateway node and said message is received on a Gx interface.

7. The method of claim 5 wherein said initiating node comprises a Bearer Binding and Event Reporting Function (BBREF) gateway node and said message is received on a Gxx interface.

8. The method of claim 5 wherein said initiating node comprises an Application Function (AF) node and said message is received on an Rx interface.

9. The method of claim 5 wherein said initiating node comprises a PCRF node and said message is received on an S9 interface.

10. A method of negotiating a release version, performed by an initiating network node, the method comprising steps of:
sending a session request comprising identification of a plurality of releases supported by said initiating node, to a receiving node; and
receiving from said receiving node, identification of a release selected by said receiving node, also supported by said receiving node from said plurality of releases.

11. A tangible and non-transitory machine-readable storage medium encoded with instructions for execution by a network node, the tangible and non-transitory machine-readable storage medium comprising:
instructions for receiving at said network node, from an initiating node, a session request comprising identification of a plurality of releases supported by said initiating node;
instructions for determining which of said plurality of releases are also supported by said network node;
instructions for selecting a preferred release from said also supported releases; and
instructions for transmitting to said initiating node, said selected release.

12. The tangible and non-transitory machine-readable storage medium of claim 11, wherein said preferred release comprises the most recent release.

13. The tangible and non-transitory machine-readable storage medium of claim 11, wherein said session request comprises a Diameter protocol message.

14. The tangible and non-transitory machine-readable storage medium of claim 13, wherein said identification of supported releases is contained in a Supported-Features Attribute Value Pair (AVP).

15. The tangible and non-transitory machine-readable storage medium of claim 11, wherein said storage medium comprises a Diameter Protocol stack.

16. The tangible and non-transitory machine-readable storage medium of claim 13, wherein said network node comprises a Policy and Charging Rule Function (PCRF) node.

17. The tangible and non-transitory machine-readable storage medium of claim 16, wherein said initiating node comprises a Policy and Charging Enforcement Function (PCEF) gateway node and said message is received on a Gx interface.

18. The tangible and non-transitory machine-readable storage medium of claim 16, wherein said initiating node comprises a Bearer Binding and Event Reporting Function (BBREF) gateway node and said message is received on a Gxx interface.

19. The tangible and non-transitory machine-readable storage medium of claim 16, wherein said initiating node comprises an Application Function (AF) node and said message is received on an Rx interface.

20. The tangible and non-transitory machine-readable storage medium of claim 16, wherein said initiating node comprises a PCRF node and said message is received on an S9 interface.

\* \* \* \* \*